United States Patent

Kingsbury et al.

[11] 4,122,805
[45] Oct. 31, 1978

[54] DIESEL ENGINE COMBUSTION CHAMBERS

[75] Inventors: William L. Kingsbury, Lansing; Kelly W. Thurston, Okemos, both of Mich.

[73] Assignee: General Motors Corporation, Detroit, Mich.

[21] Appl. No.: 809,418

[22] Filed: Jun. 24, 1977

Related U.S. Application Data

[63] Continuation-in-part of Ser. No. 710,924, Aug. 2, 1976, abandoned.

[51] Int. Cl.² .......................... F02B 3/00; F02B 23/00
[52] U.S. Cl. .............................. 123/32 ST; 123/32 C; 123/32 K; 123/33 D; 123/191 SP; 123/193 H
[58] Field of Search .................. 123/30 C, 30 D, 32 R, 123/32 C, 32 D, 32 F, 32 K, 32 JV, 33 D, 75 B, 191 R, 191 S, 191 SP, 193 H

[56] References Cited

U.S. PATENT DOCUMENTS

| 1,413,466 | 4/1922 | Gaertner | 123/33 D |
|---|---|---|---|
| 1,464,906 | 8/1923 | Hentschhe | 123/33 D |
| 2,018,727 | 10/1935 | Kibbe | 123/32 C |
| 2,103,604 | 12/1937 | Yingling | 123/32 C |
| 2,106,124 | 1/1938 | Ricardo | 123/32 R |
| 2,172,526 | 9/1939 | Treibner | 123/30 D |
| 2,314,175 | 3/1943 | Summers | 123/191 SP |
| 2,735,412 | 2/1956 | Kuepfer | 123/32 C |
| 2,753,852 | 7/1956 | Beller | 123/30 D |
| 3,044,454 | 7/1962 | Sutton | 123/32 C |
| 3,063,434 | 11/1962 | Haas | 123/32 C |
| 3,244,158 | 4/1966 | Steidler | 123/33 R |
| 3,443,553 | 5/1969 | Yamada | 123/32 R |
| 3,456,627 | 7/1969 | Spiers | 123/30 D |
| 3,924,584 | 12/1975 | Decker | 123/30 D |
| 3,965,872 | 6/1976 | Taira | 123/32 C |
| 4,004,563 | 1/1977 | Nakamura et al. | 123/32 R |
| 4,038,952 | 8/1977 | Nagano | 123/191 SP |

FOREIGN PATENT DOCUMENTS

| 173,901 | 2/1953 | Austria | 123/32 C |
|---|---|---|---|
| 908,427 | 4/1954 | Fed. Rep. of Germany | 123/32 D |
| 913,359 | 9/1946 | France | 123/32 C |

*Primary Examiner*—Charles J. Myhre
*Assistant Examiner*—David D. Reynolds
*Attorney, Agent, or Firm*—Robert J. Outland

[57] ABSTRACT

Combustion chamber arrangements for divided chamber (prechamber) type diesel engines characterized by relatively low emissions of HC, CO and $NO_x$, relatively low noise and physical stress and good fuel economy and power output and having (1) canted valves in the heads and forming therewith lateral wedge-shaped valve recesses, (2) cooperating wedge recesses in the pistons forming disc or pancake-like valve pockets in conjunction with the cylinder head recesses and (3) in-head prechambers closed by flame cups having wide connecting passages in their floors and side outlets for connection through channels with the edges of the valve pockets.

15 Claims, 12 Drawing Figures

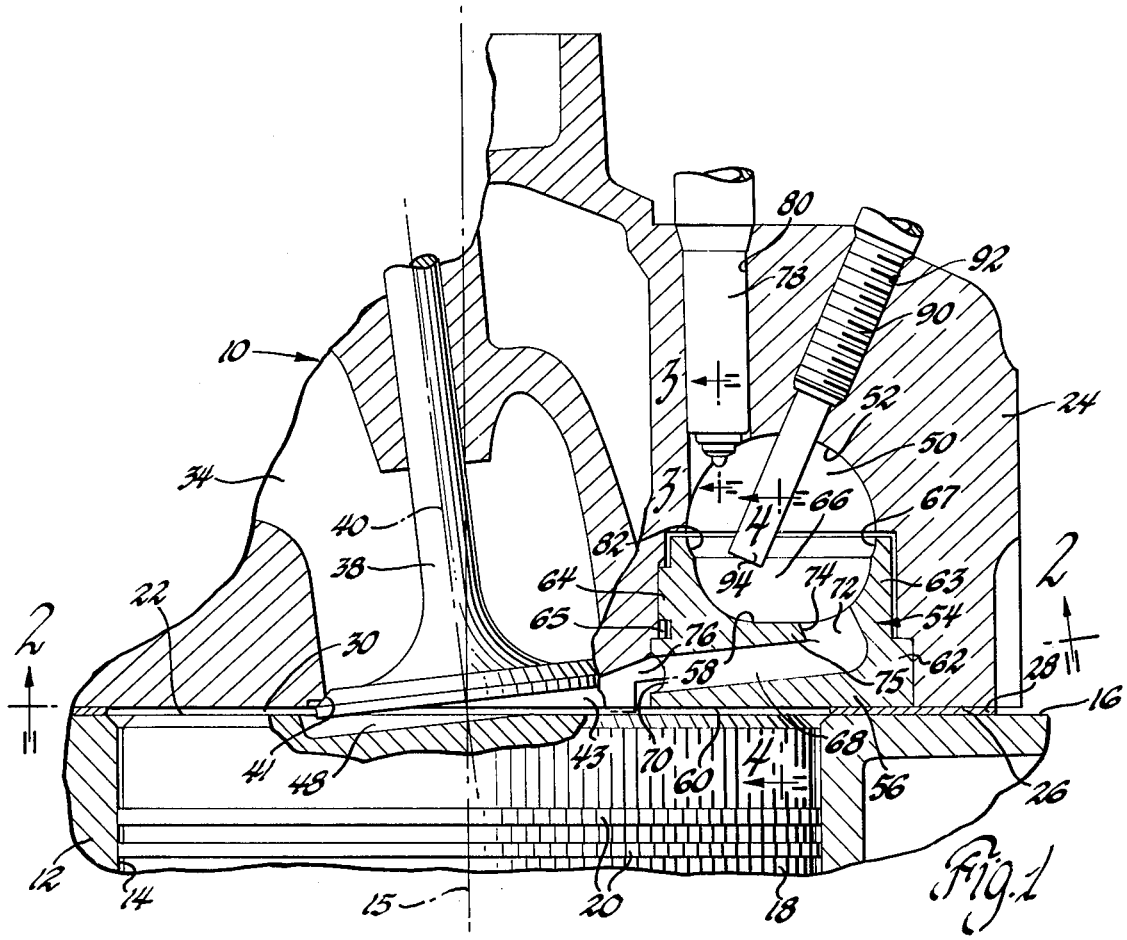
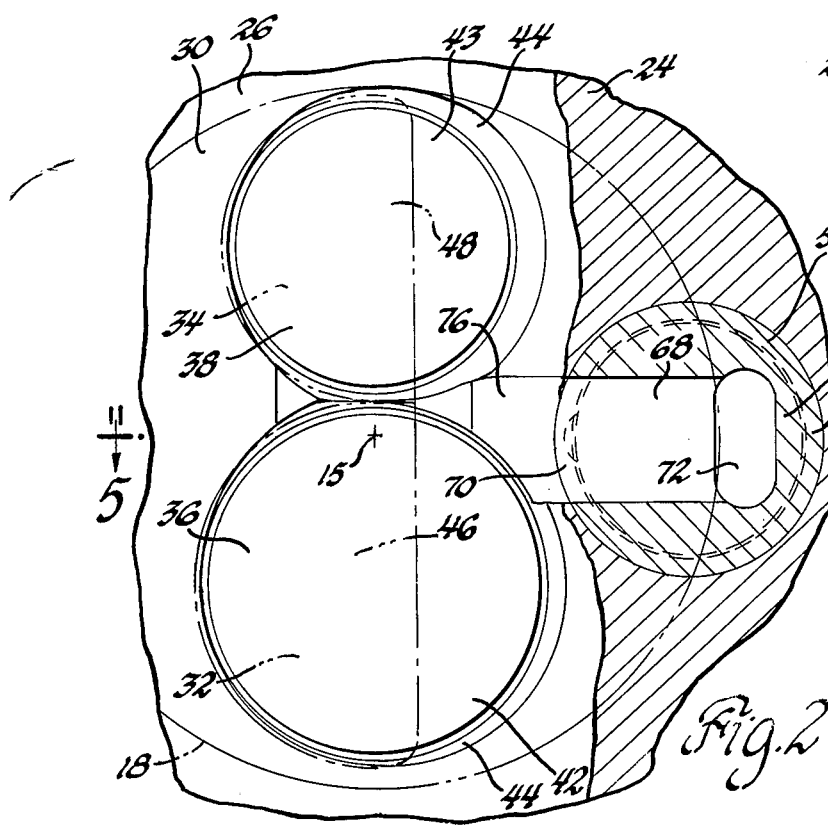
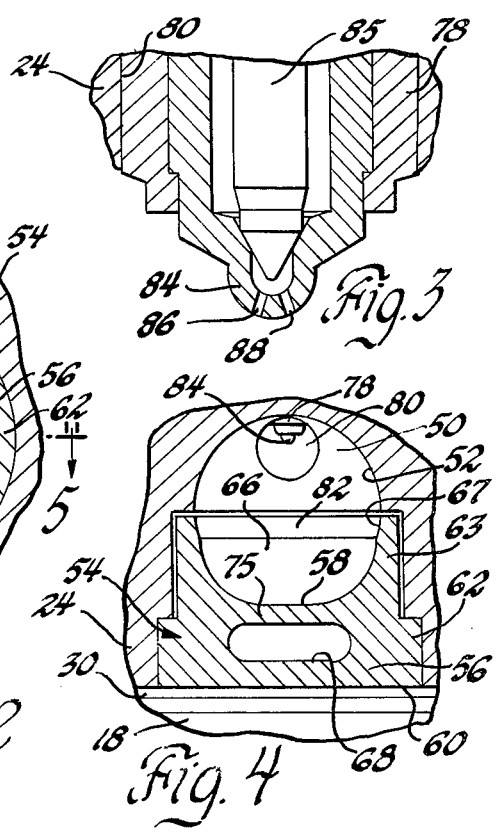

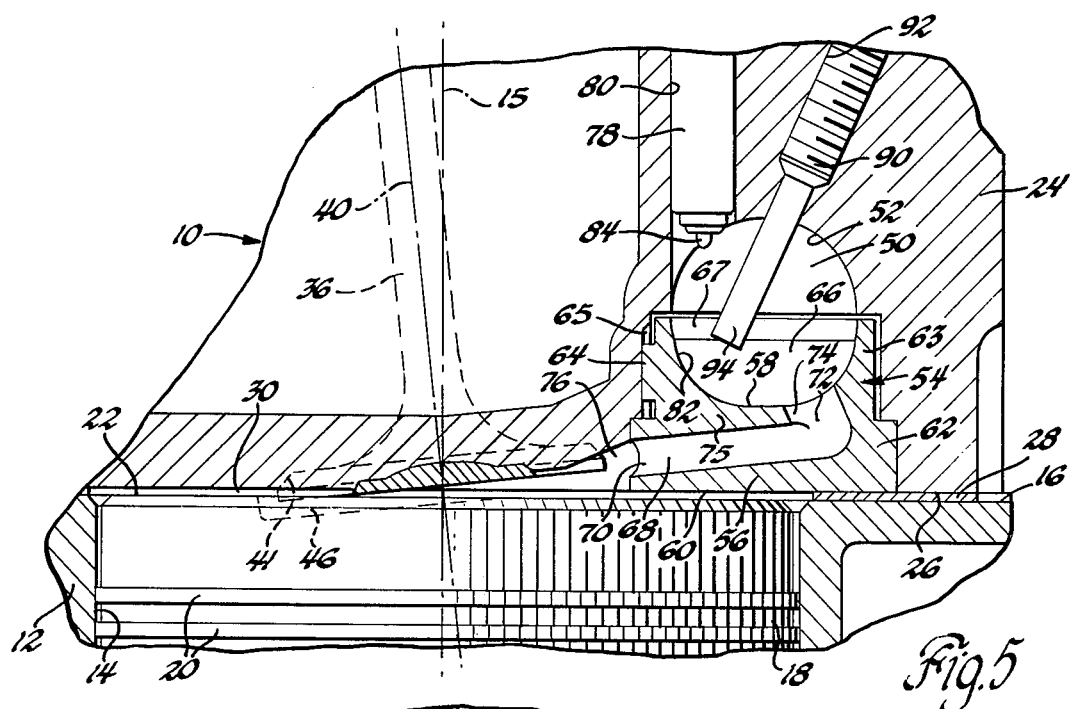
Fig. 5
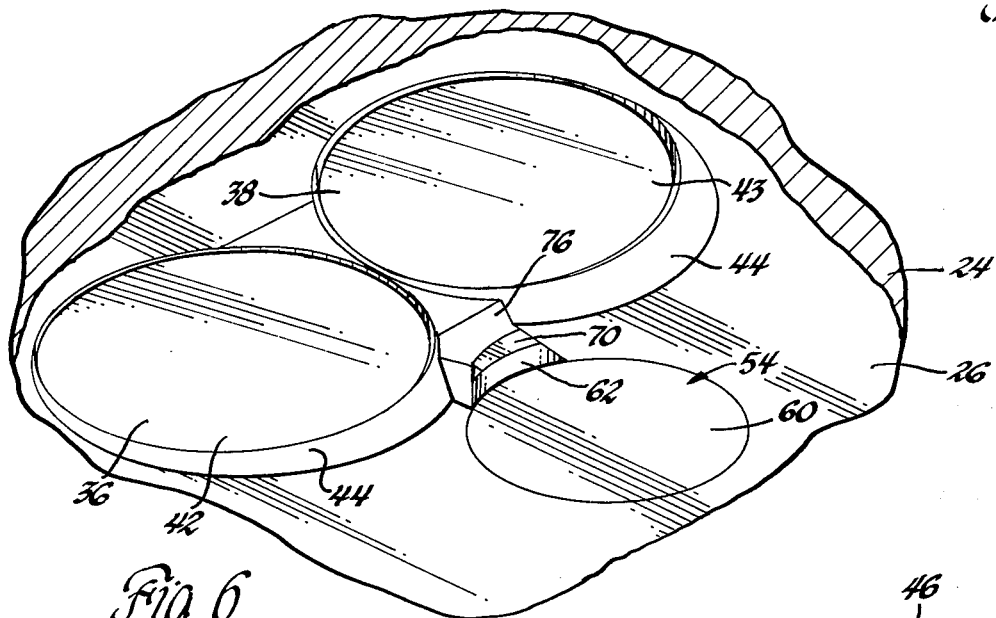
Fig. 6
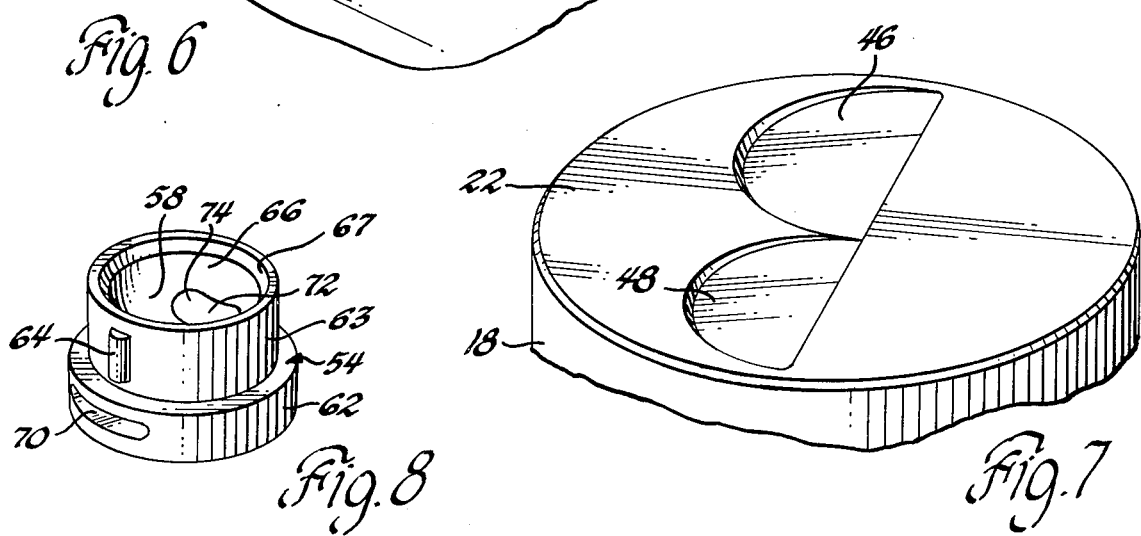
Fig. 8
Fig. 7

DIESEL ENGINE COMBUSTION CHAMBERS

This is a continuation-in-part of U.S. patent application Ser. No. 710,924 now abandoned filed Aug. 2, 1976 in the names of William L. Kingsbury and Kelly W. Thurston and assigned to the assignee of the present invention. This disclosure includes subject matter which is the invention of William L. Kingsbury, Kelly W. Thurston and Harry L. Chapman and is also disclosed and is claimed in their copending U.S. patent application Ser. No. 809,417 filed contemporaneously with this application and which is a continuation-in-part of their U.S. patent application Ser. No. 711,064 now abandoned Aug. 2, 1976, both applications having been assigned to the assignee of the present invention.

BRIEF SUMMARY OF THE INVENTION

In preferred form the engine includes a piston movable on an axis cooperating with a cylinder head having at least one poppet valve disposed on an axis canted in relation to the piston axis and defining at the piston top dead center position a shallow pancake-like pocket under the valve head and normal to the valve axis and a precombustion chamber having a discharge passage with a generally straight discharge portion in substantial alignment with the elevated side of the pocket and connected therewith to direct gaseous discharge into the pocket from the prechamber, the discharge passage at its end distal from the pocket having a portion extending sharply upward from the straight portion and opening into the precombustion chamber which in turn extends back from the opening toward the canted axis so as to form a wall bounded by the discharge passage and precombustion chamber, and means to inject fuel into the precombustion chamber in a plane generally parallel to the piston axis and towards the wall so that the air discharge into the prechamber during each compression stroke generates a swirl initially curving inwardly towards the piston axis and then traveling downwardly generally parallel to the piston axis towards the wall and the injected fuel travels with the swirling air into a temporarily locally rich mixture space above the wall wherein combustion occurs under conditions relatively unfavorable to $NO_x$ production, the size of the prechamber being roughly equivalent to the volume of the main chamber with the proportions being such that gases discharging from the precombustion chamber fan out against the valve head and cylinder head and the piston so that the piston thermal load is comparable to the thermal load of the valve and cylinder head in the main chamber. Other specific features and alternative embodiments are also disclosed.

This invention relates to internal combustion engines and, more particularly, to divided or precombustion type combustion chamber arrangements for use in diesel engines, particularly of the automotive type.

The present invention provides an improved prechamber type combustion chamber arrangement including in preferred form overlapping pancake or disc-like valve pockets preferably formed partially in the cylinder heads by wedge-shaped recesses under the heads of canted valves and partially in the pistons by wedge-shaped valve clearance recesses connecting with the cylinder head recesses. The valve pockets are connected with in-head prechambers closed by flame cups having wide connecting or discharge passages in their floors and transversely directed side outlets. These connect through lateral channels in the heads with elevated sides or edges of the valve pockets to discharge hot combustion gases laterally, and at comparatively moderate flow rates, over the associated piston, valve and cylinder head surfaces, thereby spreading the heat transfer effects over the surfaces and dividing the thermal load more or less equally between the cylinder head including the valves and the associated pistons, thus limiting localized heat transfer to the piston heads as compared to other arrangements.

The present invention further provides an improved arrangement wherein a portion of the prechamber floor is heated on one side by the alternate passage of compression and combustion gases into and out of the prechamber and the heated portion is contacted on its other side by rich burning gases and fuel droplets, the hot surface aiding in vaporization of the fuel charge. Also the invention provides a fuel injection spray tip having at least one pair of angularly disposed orifices arranged on axes lying in a plane generally parallel to the associated cylinder axis and oriented to direct fuel in a broad path outwardly and downwardly toward the heated floor portion of the prechamber.

Other features are also included in the invention which vary in some arrangements and provide in varying degrees advantageous combinations of operating characteristics including relatively low emissions of HC, CO and $NO_x$, smooth combustion with resultant low noise level and component stress, good control of smoke or visible emissions and good fuel economy.

Such diverse features of the invention include variations in the entrance angle and position of the connecting passages in their respective prechambers to control the rate of swirl therein at the time of ignition. Also, variations in the locations and orientation of the fuel nozzles, spray orifices and glow plugs can vary the balance of exhaust emissions, combustion smoothness, visible smoke and fuel economy with resultant effects on noise levels and component stress. The preferred embodiment is thought to provide the most favorable combination of such features.

These and other advantages and features of the invention will be more fully understood from the following description of certain preferred and alternative embodiments chosen for purposes of illustration, taken together with the accompanying drawings.

In the drawings

FIG. 1 is a fragmentary transverse cross-sectional view along the axis of a cylinder of an internal combustion engine formed in accordance with a preferred form of the invention with the valve injector and glow plug in side elevation and the valve port sectioned along the valve axis;

FIG. 2 is a cross-sectional view through the combustion chamber of the preferred embodiment taken generally in the plane indicated by the line 2—2 of FIG. 1;

FIG. 3 is a fragmentary cross-sectional view through the injection nozzle spray tip as viewed from the plane indicated by the line 3—3 of FIG. 1 with parts in elevation;

FIG. 4 is a fragmentary cross-sectional view through the precombustion chamber of the preferred embodiment as viewed from the plane indicated by the line 4—4 of FIG. 1;

FIG. 5 is a fragmentary cross-sectional view through the main and precombustion chambers as viewed from the transverse plane through their axes indicated by the line 5—5 of FIG. 2;

FIG. 6 is a pictorial view from underneath a portion of a cylinder head of the preferred embodiment and showing portions of the combustion chamber forming surfaces;

FIG. 7 is a pictorial view from above of a piston for use in the preferred embodiment and showing the piston head configuration;

FIG. 8 is a pictorial view of a prechamber cup for use in the preferred embodiment;

Figure 9:
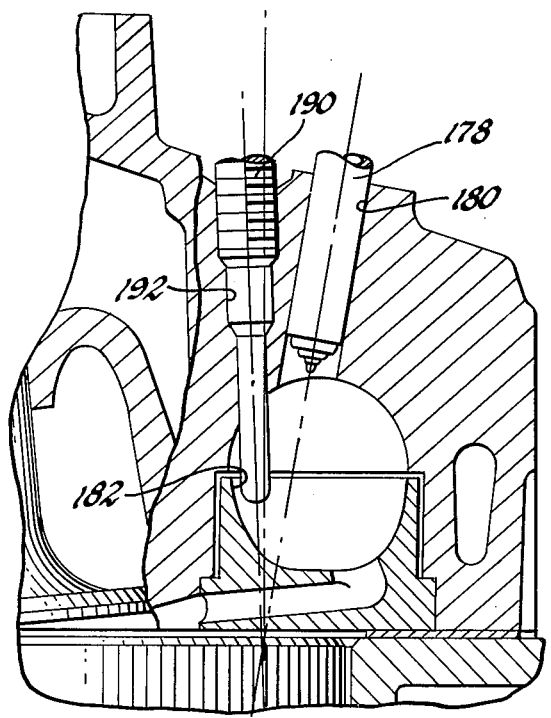
FIGS. 9, 10 and 11 are cross-sectional views with parts in elevation similar to FIG. 1, but illustrating various alternative embodiments of combustion chamber arrangements formed according to the invention.

Referring first to the embodiment of FIGS. 1-8 of the drawings, numeral 10 generally indicates an internal combustion engine of the four-stroke automotive diesel type. Engine 10 is conventionally provided with a cylinder block 12 defining a plurality of cylinders 14 having axes 15, only one of the cylinders being shown. Each of the cylinders opens through an end wall of the cylinder block 12 which is formed as a flat machined surface 16. Each cylinder has reciprocably disposed therein a piston 18 having the usual piston sealing rings 20 and having a generally flat upper surface 22 which, in the upper position of motion of the piston, known as the top dead center position, approximates a location of near alignment with the upper surface 16 of the cylinder block.

At least one cylinder head 24 is mounted on the cylinder block 12, having a generally flat lower surface 26 opposing and sealingly engaging through a gasket 28 the flat upper surface 16 of the cylinder block. The flat head surface 26 also closes the end of each cylinder 14 and, lying opposite the flat piston surfaces 22, defines together with the piston and cylinder main combustion chamber portions 30 located at the ends of the cylinders 14.

At each cylinder location the cylinder head 24 is provided with a pair of adjacent ports including an inlet port 32 and an exhaust port 34. These ports respectively connect the main combustion chamber 30 with suitable air inlet and exhaust gas discharge systems, not shown, the movement of gas between the ports and the combustion chamber being controlled respectively by inlet and exhaust poppet valves 36, 38 having heads seatable at the ends of their respective ports to close the ports.

The valves 36, 38 are carried in the head for reciprocating movement on parallel axes 40 which are canted or inclined upwardly away from a plane passing through the cylinder axis 15 and preferably extending longitudinally of the engine. The canting of the valves requires the valve seats 41 in the cylinder head to be recessed on one side, resulting in the formation of wedge-shaped valve recesses 42, 43 which are defined by the bottoms of the valves and the surrounding wall portions 44 tapering into the adjoining flat surface 26 of the cylinder head. These valve recesses are complemented by similar wedge-shaped recesses 46, 48 formed in the flat upper surface 22 of the piston to provide clearance for the initial opening or final closing motion of the heads of the respective valves. The valve recesses in the head and their related recesses in the piston cooperate to form adjoining and overlapping pancake or disc-like air turbulence valve pockets between the ends of the valves and the top of the piston and having elevated sides formed largely within the cylinder head. Use is made of these valve pockets in the design of the combustion chamber as will be subsequently more fully explained.

At each cylinder location, the cylinder head is provided with a precombustion chamber (prechamber) 50 which is located in the head above one edge of the piston and on the side of the inlet and exhaust ports opposite the direction of upward inclination of their valve axes 40. Each precombustion chamber 50 is formed in the head by a recess 52 that extends upwardly from the cylinder head bottom surface 26 and is closed at the bottom by a flame cup insert 54.

The flame cup insert comprises a unitary body having a floor (or bottom wall) portion 56 with upper and lower surfaces 58, 60 and a flanged outer edge 62 interference fitted in a complementary portion of the prechamber recess 52 to retain the insert in the head. A portion of the insert opposes the upper surface 16 of the cylinder block and engages the gasket 28 so as to positively retain the insert 54 in the cylinder head after the engine is assembled. The remainder of the insert floor lower surface 60 extends into the cylinder in opposition to the flat upper piston surface 22. It should be noted that the full extent of the lower surface 60 is unbroken by any opening.

Supported on the floor, the unitary flame cup further includes an upstanding cylindrical wall 63, the outer surface of which is spaced from the corresponding cylindrical portion of the recess 52 to provide an insulating barrier that tends to retain heat in the wall portion 63. A part cylindrical protrusion 64 cast on the exterior of wall 63 mates with a vertical drilled recess or slot 65 in the wall of head recess 52 to positively locate the flame cup in the desired position. The interior of the wall 63 is curved and smoothly connected with the upper surface 58 of the floor to define a cup-shaped interior chamber portion 66. Near its upper edge at 67, the wall interior has a part spherical portion. This portion opens to and blends with the upper portion of the recess 52 which is of part spherical configuration to form the total volume of the precombustion chamber 50.

The prechamber 50 is connected with the main chamber portion 30 by a wide and relatively shallow gas connecting and discharge passage in the floor portion 56. The passage includes a first wide mouth generally straight passage portion 68 that is in substantial alignment with the associated valve pockets and registered with the elevated sides thereof. Passage portion 68 extends laterally in the floor 56 on an axis that preferably lies in a plane approximately at right angles to the longitudinal plane defined by the valve axes. Thus, the passage portion 68 extends at a slight upward angle between the upper and lower surfaces 58, 60 of the flame cup floor, from an opening 70 in the side of the floor that does not break through the lower surface to a junction point beyond the center of the floor. Here the first passage portion joins with a second wide passage portion 72 that extends sharply upwardly toward the center of the precombustion chamber 50 forming an acute angle with the first passage portion and opening to the cup-shaped portion 66 of the prechamber through an opening 74 in the floor upper surface 58 at a point beyond the center of the floor 56 from the opening 70. From opening 74, the extension of the prechamber primarily back toward the cylinder and valve axes, causes the portion of the floor 56 between its upper surface 58 and the straight passage portion 68 to form a hot wall 75, heated in operation by combustion gases on both sides.

The sharp change in angle and orientation of the second passage portion 72 toward the center of the precombustion chamber 50 has the purpose of directing incoming gases into the prechamber with a very low degree of swirl and turbulence as compared to most other known prechamber arrangements, including the alternative embodiments of the present invention to be subsequently described. Both portions of the floor passage 68, 72 are relatively wide in relation to their depth (or thickness) in order to provide a relatively large area flow path. The dimensions of the first passage portion, as disclosed, involve a passage width about four times its depth, while the upwardly extending second passage portion has a width somewhat more than two and one-half times its thickness in the narrower lateral direction.

The flame cup passage 68, 72 connects with the elevated deeper edges of the valve recesses 42, 44 through a channel 76 cut laterally in the surface of the cylinder head and of a width substantially equal to the first passage portion 68 of the flame cup, of which the channel constitutes an extension.

The arrangement directs hot gases from the precombustion chamber laterally into the edges of the valve pockets formed between the cylinder head and piston so that the gas is directed in a wide path, fanning out across the width of the opposing cylinder head and piston surfaces rather than down upon the piston as is common practice in prechamber diesel engines. Our improved arrangement reduces localized heat transfer to the piston surface and spreads heat flow to the piston over a greater surface area while also permitting the cylinder head and valves to provide an increased proportion of heat dissipation. As a result, the piston head can accept the heat load imposed thereon without an increase in thickness sufficient to require an increase in height of the cylinder block over the height of a comparable gasoline engine of the same cylinder dimensions, thereby permitting the use of common tooling for machining both diesel and gasoline engine cylinder blocks.

In order to provide a combustible mixture of air and fuel in the precombustion chamber 50, the cylinder head mounts at each cylinder location a pencil type fuel injection nozzle 78 which is located in a bore 80 having an axis preferably parallel to the cylinder axis and opening through the upper wall of the prechamber almost tangential to the inner wall surface 82 of the prechamber at the point closest to the cylinder axis. The fuel injection nozzle is provided with a spray tip 84, best shown in FIG. 3, having a needle valve 85 and at least two angularly disposed orifices 86, 88 which lie in a plane parallel to the cylinder axis and direct injected fuel downwardly, generally parallel to the cylinder and piston axis 15, in a wide, fan-like, relatively soft spray pattern toward the sides and bottom hot wall 75 of the flame cup insert. If desired, additional orifices may be disposed in the injection nozzle spray tip to direct the fuel in an even softer pattern toward additional areas of the flame cup sides and bottom wall.

The fuel spray is preferably directed generally tangentially to and in the direction of the swirling airflow in the prechamber. It is thought this forms a locally fuel rich-zone in the prechamber which during combustion helps limit or control formation of nitrogen oxides. Subsequent mixing of the burning rich gases and air in the main combustion chamber provides for completion of combustion reactions and holds emissions of hydrocarbons and carbon monoxide to normally low diesel engine levels.

The cylinder head also mounts a glow plug 90 at each cylinder location. Each plug 90 is secured in an opening 92 having an axis that lies in a common plane with the axis of the fuel injection nozzle bore 80 and, preferably, the prechamber connecting passage 68, 72, the plane lying parallel with and preferably encompassing the axis of the cylinder. Each glow plug 90 has an elongated end 94 that extends into the prechamber in or near the path of fuel spray from the injector nozzle orifices, thus providing a hot spot to aid the prompt ignition of fuel delivered to the prechamber by the injector during engine starting and warm-up.

The various features of the above described embodiment of the invention when incorporated in an automotive type four-stroke diesel engine have been shown to provide an advantageous combination of high combustion efficiency, low smoke and emission levels and relatively low combustion noise. Through analysis of the result of tests, it is considered that the various features obtain the following specific advantages when combined in the manner illustrated.

The provision of inclined or canted valves combined with the side prechamber outlet through a thin wide passage avoids excessive localized piston head temperatures and also results in good utilization of air in the main chamber, making possible adequate power output with low smoke while utilizing a bore stroke ratio generally considered too high to be favorable for diesel engines and permitting a relatively low ratio of engine weight to power output. Another result is good mixing in the main chamber, giving relatively complete combustion and low emissions of hydrocarbons and carbon monoxide.

The abrupt bend in the flame cup connecting passage and the radial entry into the precombustion chamber cavity gives a low rate of air swirl in the prechamber compared to most swirl chamber engines. This contributes to smooth combustion with resulting low noise and stress levels.

Placement of the fuel injector nozzle centerline close to the prechamber wall and the use of a nozzle configuration giving a wide and thin spray with low penetration and in the direction of air swirl in the prechamber forms a fuel-rich region near the prechamber wall but without excessive collection of fuel on the wall. Combustion, thus occurs under locally rich conditions and in a locally low temperature zone, which aids in giving smooth combustion and low formation of nitrogen oxides.

Division of the prechamber connecting passage into two distinct flow portions permits the flow area and orientation of these portions to be optimized separately for the control of mixing in the main chamber and air motion in the prechamber.

The use of a wide thin floor in the prechamber provides a local high temperature wall area 75 which reduces ignition delay and prevents fuel from accumulating on the wall. This aids in providing smooth combustion and low hydrocarbon emissions.

In addition to the foregoing features, the associated fuel pump is preferably provided with relatively low injection pressure and slower than normal injection rates, which, when combined with precise control of injection timing, provide for combustion to begin at controlled optimum points over the speed and load range, thus contributing to the smooth combustion and low emission performance of the engine.

Reference will now be made to FIGS. 9-12 of the drawings in which various alternative embodiments of the invention are illustrated. In the main, the constructions of the various embodiments are identical. The features of difference reside in the placement and configuration of the precombustion chamber, as well as with the location and orientation of the fuel injection nozzle and glow plug for each cylinder. Thus, description of the alternative embodiments will be limited to these differing features, it being understood that the remainder of the construction in each case is identical to the first described embodiment. Similar or identical components in the various embodiments are identified by reference numerals differing by multiples of one hundred.

Referring now to the embodiment of FIG. 9 in which reference numerals in the 100 series are utilized, the arrangement shown is identical to that of the first described embodiment, with the exception of the location and orientation of the fuel injection nozzle 178 and the glow plug 190. In this embodiment, glow plug 190 is located near the prechamber inner wall surface 182, being mounted in an opening 192 inwardly of, but having an axis coplanar with, the fuel injection nozzle bore 180. In this embodiment, the spray pattern of the fuel injection nozzle is aimed in the direction of air swirl and toward the inner portion of the prechamber walls and floor very close to the area toward which the spray pattern of the injector of the first described embodiment is also aimed.

Figure 10:
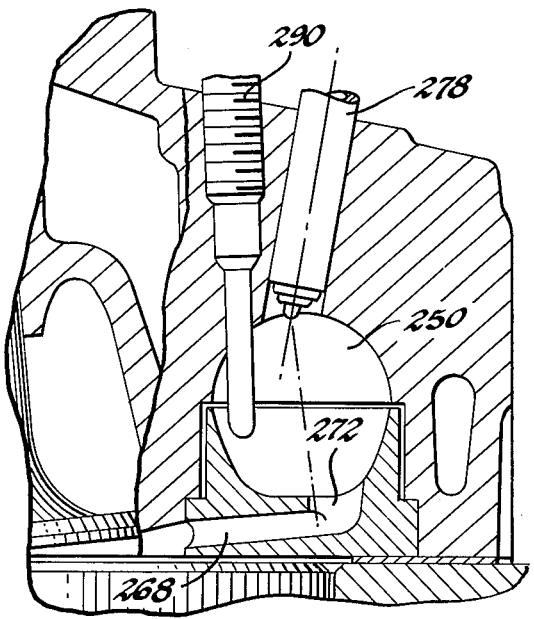

Referring now to the embodiment of FIG. 10 in which reference numerals in the 200 series are utilized, the arrangement of the fuel injector 278 and glow plug 290 is physically similar to the arrangement of these components in the embodiment of FIG. 9. However, the pattern of fuel spray from the fuel injector nozzle may be modified to be directed generally across the center of the precombustion chamber 250 toward locations near the end of the second portion 272 of the flame cup connecting passage. However, the orientation of this second passage portion 272 is also altered so that it is directed sharply upwardly at nearly right angles to the first passage portion 268, aiming at a location between the center of the prechamber and its outer side wall. The result is that this embodiment provides a greater amount of swirl in the prechamber than the first two embodiments described, resulting in somewhat faster combustion and various other differences in operating characteristics.

Figure 11:
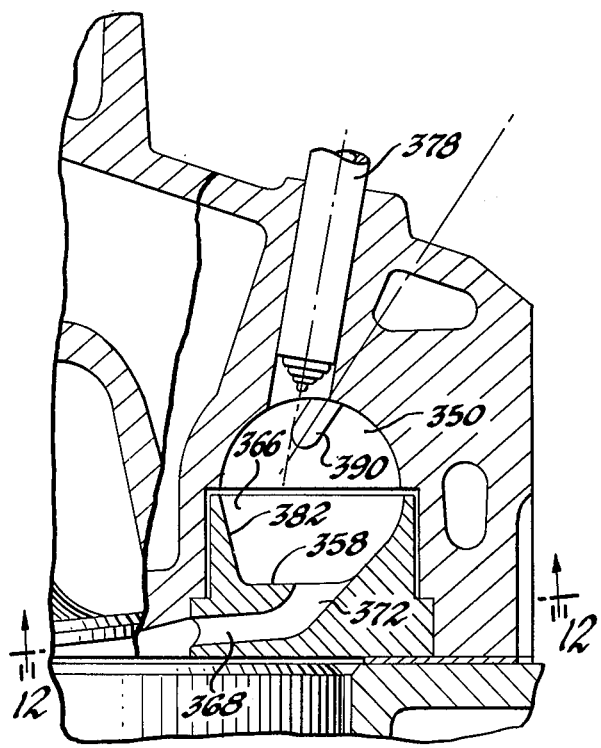
Figure 12:
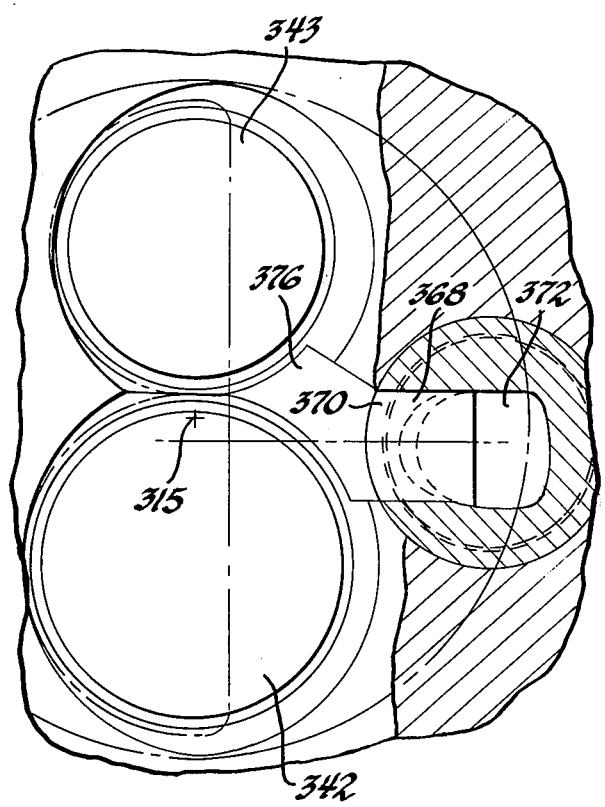
FIG. 12 is a cross-sectional view through the chamber of the last mentioned embodiment as viewed from the plane indicated by the line 10—10 of FIG. 11.

Referring now to the embodiment of FIGS. 11 and 12 in which reference numerals of the 300 series are utilized, it should be noted that placement of the fuel injector nozzle 378 is essentially the same as in the embodiments of FIGS. 9 and 10. The location and orientation of the glow plug 390 differs, however, since it is placed on an axis that does not lie on a transverse plane through the fuel injection nozzle and flame cup connecting passage. Also, the shape of the flame cup interior 366 is altered somewhat with a much sharper junction of the inner portion of the wall surface 382 with the upper surface 358 of the flame cup floor. The connecting passage is also altered in that the second passage portion 372 intersects the first portion 368 in a sharp but obtuse angle and the second portion is directed almost tangentially along the adjacent outer portion of the inner wall surface 382. This arrangement provides a relatively high degree of swirl.

One other difference is that the prechamber 350 is relocated with respect to the cylinder axis so that the central plane of the connecting passage 368, 372 does not extend through the cylinder axis. To accommodate this, an alteration is made in the shape of the connecting channel 376 which carries gas flow between the side outlet opening 370 of the flame cup first passage portion and the wedge-shaped valve pockets 342, 343 of the cylinder head.

While various alternative embodiments have been illustrated which include many of the major features of the invention as disclosed in the first described embodiment, it should be understood that numerous other variations could be made within the scope of the inventive concepts taught herein. Accordingly, it is intended that the invention not be limited by the specific embodiments disclosed but that it have the full scope permitted by the language of the following claims.

What is claimed is:

1. A precombustion chamber diesel engine of the type wherein combustion gases from a prechamber are discharged into the space between a piston and a cylinder head at substantially the top dead center position of the piston including the combination of:

a piston reciprocable on an axis between top and bottom dead center positions through successive compression and power strokes, a cylinder head in cooperating relation with the piston and having at least one poppet valve disposed on an axis canted in relation to said first axis and having a head which moves in valve opening movements toward the piston along said canted axis, the cylinder head and piston together defining a main combustion chamber having at the piston top dead center position a shallow pancake-like pocket under the valve head and extending normal to said canted axis, said pocket having an elevated side largely within the cylinder head, the cylinder head further defining a precombustion chamber having a discharge passage with a generally straight portion in substantial edge alignment with said pocket and having extent in the direction of the canted axis approximately equal to the extent of said pocket, said passage being registered with and opening into the elevated side of said pocket so as to direct gaseous discharge into said pocket from the edge thereof at its elevated portion, said discharge passage at its end distal from said pocket having a portion extending sharply upward from said straight portion and opening into the precombustion chamber which extends from the opening primarily toward the canted axis so as to form a wall bounded by the discharge passage and the precombustion chamber, and means to inject fuel into said precombustion chamber in a direction generally parallel to said first axis and toward said wall so that the air discharge into the precombustion chamber during each compression stroke generates a swirl initially curving inwardly towards said first axis and then traveling downwardly generally parallel to said axis and towards said wall and the injected fuel travels with said swirling airflow into a temporarily locally rich mixture space above the wall wherein combustion occurs under conditions relatively unfavorable to $NO_x$ production, the precombustion chamber being about the size of the main chamber and the discharge passage being arranged such that gases discharging from the precombustion chamber fan out against the valve head and cylinder head and the piston so that the piston thermal load is comparable to the thermal load of the valve and cylinder head in the main chamber.

2. A precombustion chamber diesel engine of the type wherein combustion gases from a prechamber are discharged into the space between a piston and a cylinder head at substantially the top dead center position of the piston including the combination of:

a piston reciprocable on an axis between top and bottom dead center positions through successive compression and power strokes, a cylinder head in cooperating relation with the piston and having a pair of poppet valves disposed on axes canted in relation to said first axis and having heads which move in valve opening movements toward the piston along said canted axes, the cylinder head and piston together defining a main combustion chamber having at the piston top dead center position a pair of adjoining shallow pancake-like pockets under the valve heads and extending normal to said canted axes, said pockets having elevated sides largely within the cylinder head, the cylinder head further defining a precombustion chamber having a discharge passage with a generally straight portion in substantial edge alignment with said pockets and having extent in the direction of the canted axes approximately equal to the extent of said pockets said passage being registered with and opening into the elevated sides of said pockets so as to direct gaseous discharge into said pockets from the edges thereof at their elevated portions, said discharge passage at its end distal from said pockets having a portion extending sharply upward from said straight portion and opening into the precombustion chamber which extends from the opening primarily toward the canted axes so as to form a wall bounded by the discharge passage and the precombustion chamber, and means to inject fuel into said precombustion chamber in a direction generally parallel to said first axis and toward said wall, so that the air discharge into the precombustion chamber during each compression stroke generates a swirl initially curving inwardly towards said first axis and then traveling downwardly generally parallel to said axis and towards said wall and the injected fuel travels with said swirling airflow into a temporarily locally rich mixture space above the wall wherein combustion occurs under conditions relatively unfavorable to $NO_x$ production, the precombustion chamber being about the size of the main chamber and the discharge passage being arranged such that gases discharging from the precombustion chamber fan out against the valve heads and cylinder head and the piston so that the piston thermal load is comparable to the thermal load of the valves and cylinder head in the main chamber.

3. A precombustion chamber diesel engine of the type wherein combustion gases from a prechamber are discharged into the space between a piston and a cylinder head at substantially the top dead center position of the piston including the combination of:

a piston reciprocable on an axis between top and bottom dead center positions through successive compression and power strokes, a cylinder head in cooperating relation with the piston and having a pair of poppet valves disposed on axes canted in relation to said first axis and having heads which move in valve opening movements toward the piston along said canted axes, the cylinder head and piston together defining a main combustion chamber having at the piston top dead center position a pair of adjoining shallow pancake-like pockets under the valve heads and extending normal to said canted axes, said pockets having elevated sides largely within the cylinder head, the cylinder head further defining a precombustion chamber having a discharge passage with a width more than twice its depth and including a generally straight portion in substantial edge alignment with said pockets and having extent in the direction of the canted axes approximately equal to the extent of said pockets said passage being registered with and opening into the elevated sides of said pockets so as to direct gaseous discharge into said pockets from the edges thereof at their elevated portions, said discharge passage at its end distal from said pockets having a portion extending sharply upward from said straight portion and opening into the precombustion chamber which extends from the opening primarily toward the canted axes so as to form a wall bounded by the discharge passage and the precombustion chamber, and means to inject fuel into said precombustion chamber in a direction generally parallel to said first axis and toward said wall, so that the air discharge into the precombustion chamber during each compression stroke generates a swirl initially curving inwardly towards said first axis and then traveling downwardly generally parallel to said axis and towards said wall and the injected fuel travels with said swirling airflow into a temporarily locally rich mixture space above the wall wherein combustion occurs under conditions relatively unfavorable to $NO_x$ production, the precombustion chamber being about the size of the main chamber and the discharge passage being arranged such that gases discharging from the precombustion chamber fan out against the valve heads and cylinder head and the piston so that the piston thermal load is comparable to the thermal load of the valves and cylinder head in the main chamber.

4. In combination in a diesel engine, means defining a cylinder having an axis, a piston reciprocably carried in the cylinder and a cylinder head having a generally flat lower surface closing the end of the cylinder and defining in cooperation with the piston a main combustion chamber at the end of the cylinder, said cylinder head having adjacent inlet and exhaust ports opening to the combustion chamber and closed by poppet valves having heads and movable on axes inclined upwardly away from a plane passing through the cylinder axis such that the valve heads are canted with respect to the lower surface of the cylinder head so as to form, in closed position, wedge-shaped valve recesses in the cylinder head surface, a precombustion chamber formed in the cylinder head on the side of the inlet and exhaust ports opposite the inclination of the valve axes and defined by a recess in the cylinder head closed by a flame cup having a bottom wall with an unbroken lower surface flush with the lower surface of the cylinder head, said valve recesses being connected with said precombustion-chamber by a channel extending outwardly from the edges of the deeper portions of the wedge-shaped valve recesses to the flame cup and a passage in the bottom wall of the flame cup, opening to said channel through the side of the flame cup bottom wall and extending to the precombustion chamber.

5. In combination in a diesel engine, means defining a cylinder having an axis, a piston reciprocably carried in the cylinder and a cylinder head having a generally flat lower surface closing the end of the cylinder and defining in cooperation with the piston a main combustion chamber at the end of the cylinder, said cylinder head having adjacent inlet and exhaust ports opening to the combustion chamber and closed by poppet valves having heads and movable on axes inclined upwardly away from a plane passing through the cylinder axis such that the valve heads are canted with respect to the lower surface of the cylinder head so as to form, in closed position, wedge-shaped valve recesses in the cylinder head surface, a precombustion chamber formed in the cylinder head on the side of the inlet and exhaust ports opposite the inclination of the valve axes and defined by a recess in the cylinder head closed by a flame cup having a bottom wall with an unbroken lower surface flush with the lower surface of the cylinder head, said valve recesses being connected with said valve recesses by a channel extending outwardly from the edges of the deeper portions of the wedge-shaped precombustion chamber to the flame cup and a passage in the bottom wall of the flame cup, opening to said channel through the side of the flame cup bottom wall and extending to the precombustion chamber, said piston having a generally flat upper surface opposing the cylinder head lower surface, and having shallow wedge-shaped recesses in its upper surface and opposite the near portions of said valve heads to provide clearance for partial valve movement, said piston recesses cooperating with the valve recesses in the head to provide disc-like valve pockets in the main combustion chamber and connected with the precombustion chamber.

6. The combination of claim 5 wherein the flame cup bottom wall has an upper surface and the flame cup passage extends at least half way across said bottom wall, opening to the precombustion chamber through an opening in said upper surface.

7. The combination of claim 6 wherein said flame cup passage includes a first wide portion extending transversely in the bottom wall from said side opening to a junction point beyond the center of said bottom wall and a second wide portion extending from said junction point upwardly toward said precombustion chamber at a sharp angle with said first passage portion to direct gas flow into said precombustion chamber with a limited amount of swirl and turbulence.

8. The combination of claim 6 wherein said flame cup passage includes a first wide portion extending transversely in the bottom wall from said side opening to a junction point beyond the center of said bottom wall and a second wide portion extending from said junction point upwardly toward the center of said precombustion chamber at an acute angle with said first passage portion to direct gas flow into said precombustion chamber with a minimum of swirl and turbulence.

9. In combination in an a diesel engine, means defining a cylinder having an axis, a piston reciprocably carried in the cylinder and a cylinder head having a generally flat lower surface closing the end of the cylinder and defining in cooperation with the piston a main combustion chamber at the end of the cylinder, said cylinder head having adjacent inlet and exhaust ports opening to the combustion chamber and closed by poppet valves having heads and movable on axes inclined upwardly away from a plane passing through the cylinder axis such that the valve heads are canted with respect to the lower surface of the cylinder head so as to form, in closed position, wedge-shaped valve recesses in the cylinder head surface, a precombustion chamber formed in the cylinder head on the side of the inlet and exhaust ports opposite the inclination of the valve axes and defined by a recess in the cylinder head closed by a flame cup having a bottom wall with an unbroken lower surface flush with the lower surface of the cylinder head, said valve recesses being connected with said precombustion chamber by a channel extending outwardly from the edges of the deeper portions of the wedge-shaped valve recesses to the flame cup and a passage in the bottom wall of the flame cup, opening to said channel through the side of the flame cup bottom wall and extending to the precombustion chamber, a fuel injection nozzle extending into said precombustion chamber to supply fuel thereto and a glow plug having an elongated end extending into said precombustion chamber to aid ignition of fuel therein, said injection nozzle and said glow plug end having axes coplanar with the axis of said flame cup passage.

10. The combination of claim 9 wherein the axis of said fuel injection nozzle lies parallel to said cylinder axis and the nozzle is arranged to spray the complete fuel charge into the portion of the prechamber lying closest to the cylinder axis.

11. In a diesel engine having a cylinder and a cylinder head which includes a precombustion chamber and a flat lower surface closing an end of said cylinder, the combination comprising a flame cup forming a portion of the chamber and including a continuous upstanding wall, a floor having an upper surface supporting said wall and forming the bottom of said chamber and an unbroken lower surface flush with said cylinder head lower surface, a gas passage in the floor and having a first portion extending at a slight upward angle from an opening in the side of the floor and passing between the upper and lower surfaces of the floor, said first portion connecting with a second portion extending upwardly at a sharper angle through the upper surface of the floor toward an interior point of said chamber spaced away from said upstanding wall so as to direct gas flow into said chamber in a manner to limit swirl therein, a channel formed in the cylinder head in alignment with said first portion of the flame cup gas passage and extending at a similar angle downwardly and away from said passage, said channel and passage together forming a smooth path for movement of gases between the precombustion chamber and the cylinder.

12. The combination of claim 11 wherein said flame cup passage has a width more than twice as great as its depth.

13. The combination of claim 12 wherein the second portion of said gas passage connects with said first portion at an acute angle, said passage second portion having a longitudinal axis directed generally toward the center of said precombustion chamber.

14. A flame cup adapted for installation in a diesel engine cylinder head to form part of a precombustion chamber in said head, said flame cup comprising a unitary body having a floor with upper and lower surfaces, the latter being unbroken, and a continuous upstanding wall on said floor and having a curved interior surface smoothly connected with the upper surface of said floor to define a cup shaped interior chamber portion, and a gas passage through said floor and connecting with said interior chamber portion, said gas passage comprising a first wide passage portion opening to the exterior of said floor at one side thereof above the lower surface, and extending transversely between said upper and lower surfaces to a junction point beyond the center of said floor, and a second wide passage portion extending upwardly from said junction point at a sharp angle with said first passage portion toward an interior point of said cup shaped chamber spaced away from said upstanding wall so as to direct gas flow into said cup shaped chamber portion in a manner to limit the resulting swirl or turbulence.

15. A flame cup adapted for installation in a diesel engine cylinder head to form part of a precombustion chamber in said head, said flame cup comprising a unitary body having a floor with upper and lower surfaces, the latter being unbroken, and a continuous upstanding wall on said floor and having a curved interior surface smoothly connected with the upper surface of said floor to define a cup shaped interior chamber portion, and a gas passage through said floor and connecting with said cup shaped chamber portion, said gas passage comprising a first wide passage portion opening to the exterior of said floor at one side thereof above the lower surface, and extending transversely between said upper and lower surfaces to a junction point beyond the center of said floor, and a second wide passage portion extending upwardly from said junction point toward the interior of said cup shaped chamber portion at an acute angle with said first passage portion so as to direct gas flow into said cup shaped chamber portion in a manner to limit the resulting swirl or turbulence.

* * * * *

UNITED STATES PATENT AND TRADEMARK OFFICE
CERTIFICATE OF CORRECTION

PATENT NO. : 4,122,805
DATED : October 31, 1978
INVENTOR(S) : William L. Kingsbury et al It is certified that error appears in the above-identified patent and that said Letters Patent are hereby corrected as shown below:

On the title page, add to the Abstract the paragraph in column 1, lines 18-52.

Column 1, delete from the specification lines 17-52 beginning "BRIEF SUMMARY" and ending "are also disclosed."

Column 11, line 29, "valve recesses" (second occurrence) should read --precombustion chamber--.

Column 11, lines 31-32, "precombustion chamber" should read --valve recesses--.

Signed and Sealed this

Third Day of April 1979

[SEAL]

Attest:

RUTH C. MASON
Attesting Officer

DONALD W. BANNER
Commissioner of Patents and Trademarks